(12) United States Patent
Barbieri et al.

(10) Patent No.: US 8,984,572 B2
(45) Date of Patent: Mar. 17, 2015

(54) METHOD AND SYSTEM FOR TRANSMITTING CHANNELS TO AT LEAST ONE DIGITAL VIDEO RECORDER

(75) Inventors: Mauro Barbieri, Eindhoven (NL); Adolf Proidl, Eindhoven (NL); Serverius Petrus Paulus Pronk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 205 days.

(21) Appl. No.: 13/386,045

(22) PCT Filed: Jul. 16, 2010

(86) PCT No.: PCT/IB2010/053255
§ 371 (c)(1),
(2), (4) Date: Jan. 20, 2012

(87) PCT Pub. No.: WO2011/010261
PCT Pub. Date: Jan. 27, 2011

(65) Prior Publication Data
US 2012/0124635 A1    May 17, 2012

(30) Foreign Application Priority Data
Jul. 24, 2009   (EP) .................................. 09166302

(51) Int. Cl.
*H04N 7/173* (2011.01)
*H04N 7/16* (2011.01)
(Continued)

(52) U.S. Cl.
CPC .............. *H04N 5/76* (2013.01); *H04H 20/40* (2013.01); *H04H 20/42* (2013.01)
USPC ............... 725/95; 725/91; 725/93; 725/96; 725/97; 725/100; 725/58

(58) Field of Classification Search
USPC .............................................. 725/58, 86–100
See application file for complete search history.

(56) References Cited

U.S. PATENT DOCUMENTS

2005/0283818 A1 * 12/2005 Zimmermann et al. ...... 725/134
2007/0180465 A1 *  8/2007 Ou et al. ........................ 725/34
(Continued)

FOREIGN PATENT DOCUMENTS

WO     WO2008118678 A2    10/2008

OTHER PUBLICATIONS

Dave Brown et al., "Switched Digital Video: Not Just for America Anymore", International Broadcasting Conference, 2008; Sep. 11, 2008-Sep. 15, 2008; Amsterdam.
(Continued)

*Primary Examiner* — Nasser Goodarzi
*Assistant Examiner* — Fred Peng
(74) *Attorney, Agent, or Firm* — Larry Liberchuk

(57) ABSTRACT

A method and system for transmitting channels to at least one digital video recorder is described. A server receives at least one recording schedule from a plurality of digital video recorders (step 304). A subset of channels is selected from the channels associated with the at least one program identification of the received at least one recording schedule (step 306). Information is transmitted from the server to at least one of the plurality of digital video recorders, the information indicating channels associated with the at least one program identification of the at least one recording schedule that were not selected (step 308). The selected subset of channels is also transmitted from the server to at least one of the plurality of digital video recorders (step 310).

13 Claims, 2 Drawing Sheets

(51) Int. Cl.
*H04N 5/445* (2011.01)
*G06F 3/00* (2006.01)
*G06F 13/00* (2006.01)
*H04N 5/76* (2006.01)
*H04H 20/40* (2008.01)
*H04H 20/42* (2008.01)

(56) References Cited

U.S. PATENT DOCUMENTS

| | | |
|---|---|---|
| 2008/0229379 A1 | 9/2008 | Akhter |
| 2009/0025027 A1* | 1/2009 | Craner ............... 725/32 |
| 2009/0100489 A1 | 4/2009 | Strothmann |
| 2009/0165056 A1 | 6/2009 | Sparrell |
| 2009/0328106 A1* | 12/2009 | Levitan ............... 725/46 |
| 2010/0050218 A1* | 2/2010 | Carlucci et al. ............ 725/95 |
| 2012/0167152 A1* | 6/2012 | Pedlow et al. ............. 725/95 |
| 2012/0180080 A1* | 7/2012 | Lajoie ............... 725/14 |
| 2012/0272273 A1* | 10/2012 | Grannan et al. ............ 725/50 |

OTHER PUBLICATIONS

Motorola., "Using Bandwidth more Efficiently with Switched Digital Video", Internet Citation, Sep. 1, 2007, pp. 1-9.
"Switched Digital Video—Will it impact you?" http://support.tivo.com/app/answers/detail/a_id/307, May 7, 2009.
"Personalized Video Experiences", 2009.
A. Breznick et al., "A Switch in Time: The Role of Switched Digital Video in Easing the Looming Bandwidth Crisis in Cable", Industry Analyst Forum, IEEE Communications Magazine, Jun. 2008, pp. 96-102.

* cited by examiner

METHOD AND SYSTEM FOR TRANSMITTING CHANNELS TO AT LEAST ONE DIGITAL VIDEO RECORDER

FIELD OF THE INVENTION

The present invention relates to a method and system for transmitting channels to at least one digital video recorder.

BACKGROUND OF THE INVENTION

Channel providers now offer ever increasing number of channels in addition to high definition (HD), on demand choices and high-speed data services. In traditional systems, every service (excluding Video on Demand) is always available for its subscribers regardless of whether someone is watching it. However, making all these types of content and services available requires an enormous amount of bandwidth.

This is partially overcome by channel providers developing switched digital video technology (SDV), which delivers digital video in a more bandwidth-efficient way. For example, in a household where users are watching N different channels at the same time and where there is overlap among the channels that are being watched at particular times (a rule of thumb is that 80% of the users watch 20% of the content), bandwidth is saved by transmitting only the channels that are actually being watched which, in effect, provides a continuous video-on-demand system. Rarely all available channels are watched at the same time by a group of users, so by transmitting only the channels that are being watched, bandwidth can be reused to offer more services.

US 2008/0229379 describes a specific implementing action of channel change requests in an SDV system.

Essentially, SDV works based on the assumption that most viewers will watch the most popular channels most of the time and that niche content is rarely accessed. While this assumption is true for real users, it does not hold for digital video recorders (DVRs) that acquire content on behalf of the user, based on automatic recommendation technology and user preferences. In the case of DVRs, it is not feasible to exclude a large number of TV channels from being delivered since the recording requests from DVRs require a more varied choice of channels to be delivered at the same time. This requires much higher bandwidth, which for some channel providers is impossible.

SUMMARY OF THE INVENTION

The invention seeks to provide a method and system that provides an increased number of channels using minimum bandwidth.

This is achieved, according to one aspect of the present invention, by a method for transmitting channels to at least one digital video recorder, each at least one digital video recorder having a recording schedule, the method comprising the steps of: receiving at least one recording schedule from a plurality of digital video recorders, each of the at least one recording schedule comprising at least one program identification; selecting a subset of channels from the channels associated with the at least one program identification of the received at least one recording schedule; transmitting information to at least one of the plurality of digital video recorders, the information indicating channels associated with the at least one program identification of the at least one recording schedule that were not selected; and transmitting the selected subset of channels to at least one of the plurality of digital video recorders.

This is also achieved, according to a second aspect of the present invention, by a digital video recorder comprising: a scheduler for generating a recording schedule, the recording schedule comprising at least one program identification; a transmitter for transmitting the generated recording schedule to a server; and a receiver for receiving a selected subset of channels from the channels associated with the at least one program identification and for receiving information indicating channels associated with the at least one program identification of the recording schedule that were not selected.

This is also achieved, according to a third aspect of the present invention, by a server comprising: a receiver for receiving at least one recording schedule from a plurality of digital video recorders, the at least one recording schedule comprising at least one program identification; a selector for selecting a subset of channels from the channels associated with the at least one program identification of the received at least one recording schedule; a transmitter for transmitting information to at least one of the plurality of digital video recorders, the information indicating channels associated with the at least one program identification of the at least one recording schedule that were not selected and transmitting the selected subset of channels to at least one of the plurality of digital video recorders.

This is also achieved, according to a fourth aspect of the present invention, by a system for transmitting channels to at least one digital video recorder comprising: a plurality of digital video recorders, each of the plurality of digital video recorders having a recording schedule; a receiver for receiving at least one recording schedule from the plurality of digital video recorders, each of the at least one recording schedule comprising at least one program identification; a selector for selecting a subset of channels from the channels associated with the at least one program identification of the received at least one recording schedule; a transmitter for transmitting information to at least one of the plurality of digital video recorders, the information indicating channels associated with the at least one program identification of the recording schedule that were not selected and transmitting the selected subset of channels to at least one of the plurality of digital video recorders.

In this way, the digital video recorders are aware if a certain channel is not available at a certain time (and thus are aware if the recording schedule cannot be fully executed) in advance of the channels being sent. This provides enough time for the digital video recorders to execute a reselection.

The at least one program identification identifies a plurality of programs, each of the plurality of programs having a priority value and wherein the step of selecting a subset of channels from the channels associated with the at least one program identification may comprise selecting a subset of channels from the channels associated with the at least one program identification on the basis of the priority values. The priority value expresses the like-degree of the user (i.e. how interested the user is in a particular program). This increases the probability that programs that are most interesting to the user are included in the subset of channels to be transmitted. Only programs with a low priority value (and hence, least liked by the user) will be omitted from the subset if required.

The step of transmitting information to at least one of the plurality of digital video recorders may comprise transmitting the information to those digital video recorders having a recording schedule comprising at least one program identification associated with a channel that was not selected. In this way, only digital video recorders whose recording schedule cannot be fully executed because certain channels are not available for transmission are notified. This prevents any unwanted or unnecessary information being transmitted to digital video recorders whose recording schedules can be fully executed.

The step of selecting a subset of channels from the channels associated with the at least one program identification may comprise selecting a subset of channels from the channels associated with the at least one program identification based on statistics of most popular channels divided by time of the day, day, region.

The digital video recorder may further comprise: a processor for adapting the recording schedule on the basis of the received information. By adapting the recording schedule, the user is still provided with a complete recording schedule (with an alternative channel transmitted in place of a channel that was not available for transmission). Also, the adaption of the recording schedule is carried out in advance of the channels being transmitted so the user is not presented with any delay.

The recording schedule may be determined according to user preferences and the recording schedule may be adapted automatically on the basis of said user preferences. In this way, the user has a high degree of control over and can personalize the recording schedule.

The recording schedule may be adapted by requesting a user to select alternative program identifications to be included in the adapted recording schedule. This means that the user's choice is given preference, which gives the user more control over the channels that they are recording.

The program identification may identify a plurality of programs and the plurality of programs may be selected by a user and/or automatically selected by the digital video recorder.

The programs selected by a user may have a higher priority value than programs automatically selected by the digital video recorder The processor may further update the recording schedule if the recording schedule is changed by the digital video recorder and/or if the recording schedule is changed by a user. In this way, the recording schedule is constantly updated based on current conditions or requirements e.g. if a new program guide becomes available or a user changes their mind about the programs they wish to record.

The program identifications may comprise the channel associated with each of a plurality of programs and at least one of: the date of each of a plurality of programs, the time of each of a plurality of programs, the end time of each of a plurality of programs, the duration of each of a plurality of programs, and the unique numeric key of each of a plurality of programs.

The subset of channels may be selected to use minimum bandwidth and/or to use maximum service availability.

The selector of the server may impose a deadline for receiving a plurality of recording schedules from a plurality of digital video recorders after which, the selector selects a subset of channels from the channels associated with the at least one program identification of the recording schedules that have been received in advance of the deadline.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION

Figure 1:
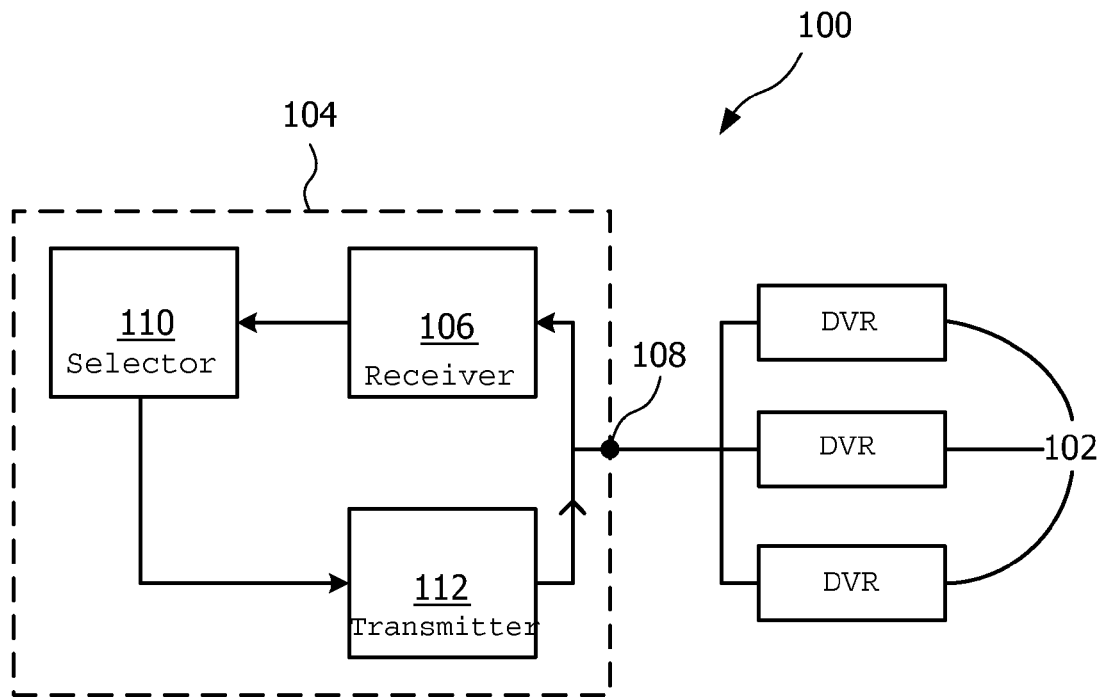
FIG. 1 is a simplified schematic of a system for transmitting channels to at least one digital video recorder in accordance with the invention.

With reference to FIG. 1, the system 100 comprises a plurality of DVRs 102 in communication with a server 104.

The server (or distribution hub) 104 comprises a receiver 106 for receiving recording schedules from the plurality of DVRs 102 via an input/output terminal 108 of the server 104. The output of the receiver 106 is connected to a selector (or SDV manager device) 110. The output of the selector 110 is connected to a transmitter 112 for transmitting channels and information to the plurality of DVRs 102 via the input/output terminal 108.

Figure 2:
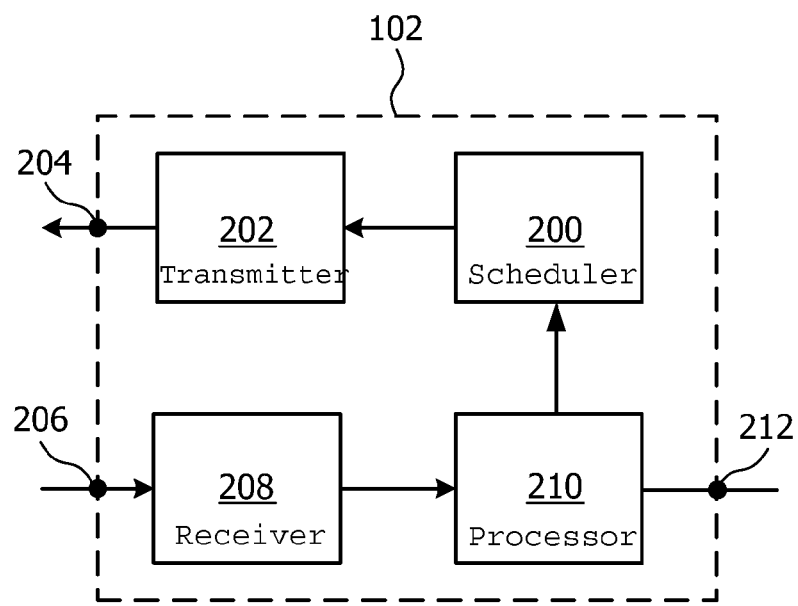
FIG. 2 is a simplified schematic of a digital video recorder in accordance with the invention.

With reference to FIG. 2, the DVRs 102 each comprise a scheduler 200 for providing a recording schedule. The output of the scheduler 200 is connected to a transmitter 202 for transmitting the recording schedule to the server 104 via an output terminal 204 of the DVR 102. The DVRs 102 also comprise a receiver 208 for receiving channels and information from the server 104 via an input terminal 206 of the DVR 102. The output of the receiver 208 is connected to a processor 210. The output of the processor 210 is connected to the scheduler 200. A user may change the recording schedule at any time via the input/output terminal 212 (for example, using a remote control).

Figure 3:
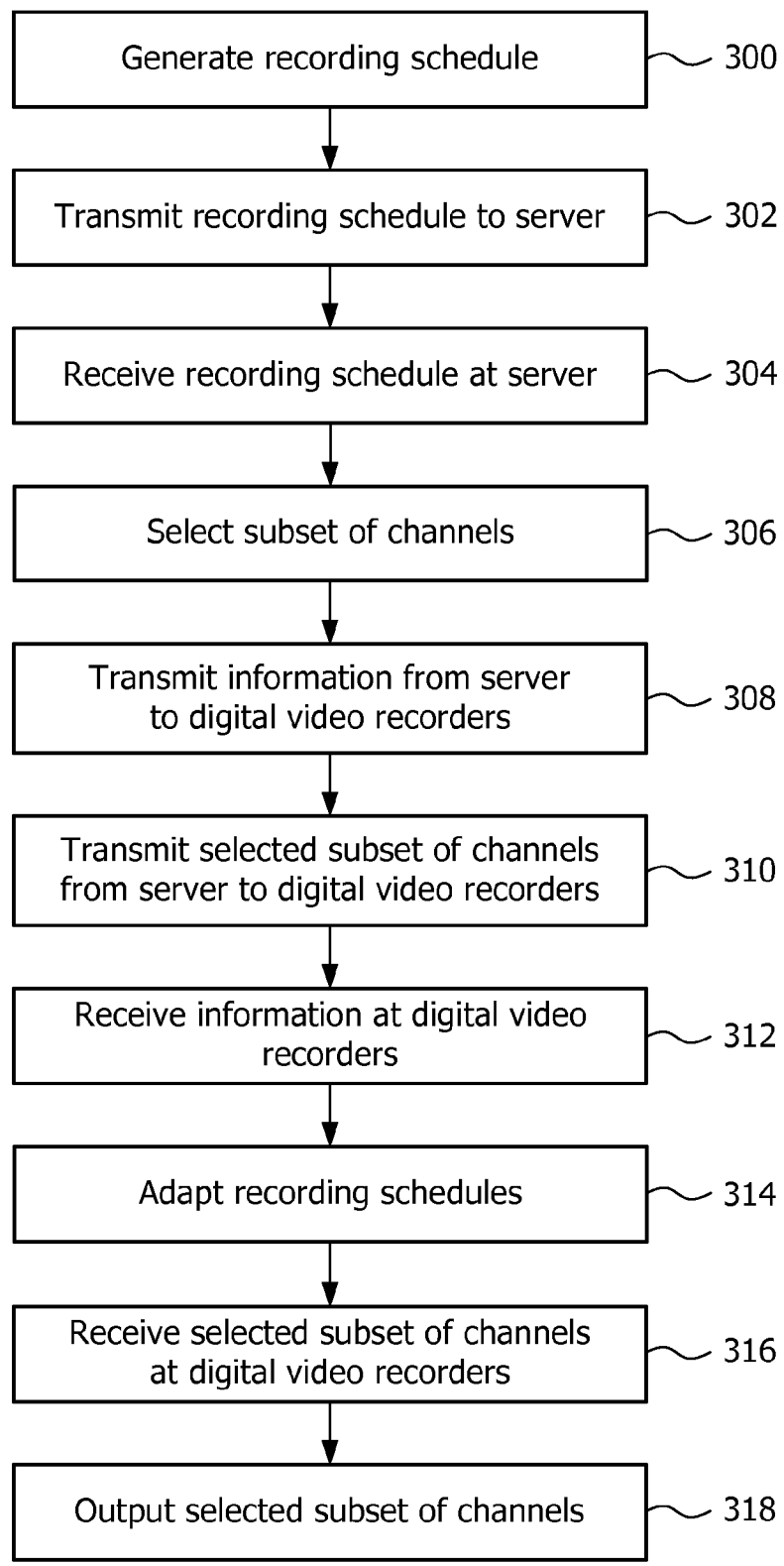
FIG. 3 is a flowchart of a method for transmitting channels to at least one digital video recorder in accordance with the invention.

The operation of the system 100 will now be described with reference to the flowchart shown in FIG. 3.

The scheduler 200 of one of the plurality of DVRs 102 generates a recording schedule comprising at least one program identification (step 300). Each of the program identifications identify a plurality of programs, which have been selected by a user and/or which have been automatically selected by the DVR 102 based on user preferences. The user preferences identify programs that a user may be interested in viewing. For example, if a user regularly watches programs of a particular type, these types of programs are considered interesting to the user and are identified by the program identifications in the recording schedule. Alternatively, a user may select certain programs that they are interested in watching and these programs are identified by the program identifications in the recording schedule.

The program identifications include the channel associated with each of the plurality of programs and may also include the date of each of the plurality of programs, the time of each of the plurality of programs, the end time of each of the plurality of programs, the duration of each of the plurality of programs, and/or the unique numeric key (which is generally associated with programs) of each of a plurality of programs. Each of the plurality of programs identified by the program identifications has a priority value. The priority value indicates how important each program is for the user. For example, programs that are watched most regularly by a user are considered most interesting to the user and therefore have a higher priority value, whereas programs that are watched less regularly by the user have a lower priority value. Also, programs that are selected by a user in real-time (for example, using a remote control) are given a higher priority value than programs that are automatically selected by the DVR 102.

The scheduler 200 generates the recording schedule comprising at least one program identification and forwards the recording schedule to the transmitter 202. The transmitter 202 transmits the recording schedule to the server 104 via the output terminal 204 (step 302). Each DVR may provide a recording schedule to the server 104, as described above.

The receiver 106 of the server 104 receives at least one recording schedule from the plurality of DVRs via the input/output terminal 108 and inputs the received at least one recording schedule into the selector 110 (step 304).

The selector 110 is responsible for allocating bandwidth to the channels that are required by the DVRs 102, taking into consideration typical usage data. The selector 110 selects a subset of channels from the channels associated with the at least one program identification of the received at least one recording schedule (step 306). In other words, the selector 110 selects (or calculates) a channel allocation plan.

If the program identifications have a priority value, the selector 110 selects the subset of channels from the channels associated with the at least one program identification on the basis of these priority values. The selector 110 also selects the subset of channels based on the combination of channels associated with the at least one program identification that will use the minimum bandwidth and the combination of channels that will provide the maximum service availability. In other words, the selector 110 selects (or calculates) a channel allocation plan that maximizes service availability while saving as much bandwidth as possible.

Besides the selector 110 selecting a subset of channels for the DVRs, the selector 110 also serves broadcast channels to the DVRs for live watching. In this case, the selector 110 takes the popularity of channels into consideration when selecting the channels for transmission. The popularity of channels for live viewing may change in the course of the day, over the week and differ per region. Additionally, the selection of channels is not static (for example, over the day, the channels selected will change). It is therefore necessary to indicate which channels are available at each moment in time. This is achieved by the selector 110 selecting the subset of channels from the channels associated with the at least one program identification based on statistics of the most popular channels divided by the time of the day, the day, and the region.

To optimize the performance of the system 100, the selector 110 of the server 104 may impose a deadline to each of the DVRs for the transmission of their recording schedules to the server 104. Once the deadline has expired, the selector 110 of the server 104 will select a subset of channels from the channels associated with the at least one program identification of the recording schedules that were received in advance of the deadline. The selector 110 of the server 104 can then select/calculate the optimal channel allocation plan for the DVRs based on the program identifications of each of the recording schedules.

The selector 110 can keep track of how fair the channels have been allocated for all DVRs and take this into consideration in selecting the subset of channels. In this way, all DVRs can be ensured to be treated equally (e.g. some DVR may require quite unpopular channels, which should be allocated sufficiently often to satisfy these DVRs' demands). The selector 110 may not be able to serve all DVRs equally fair in this way. and so a credit system could be used to satisfy the DVR users. Credits are obtained every time a DVR request cannot be satisfied. Credits can be then exchanged with discounts, monetary prizes, etc.

The selector 110 inputs the selected subset of channels from the channels associated with the at least one program identification into the transmitter 112. The transmitter 112 transmits information to at least one of the plurality of DVRs 102 via the input/output terminal 108 (step 308). The information indicates channels associated with the program identifications of the recording schedule that were not selected by the selector 110.

The transmitter 112 may transmit the information by broadcasting the information such that each DVR receives and accepts the information. By sending the information only once to all DVRs in this way, the communication overhead is limited compared to, for example, sending a separate list of channels to each DVR. Alternatively to broadcasting the information, the transmitter 112 may only transmit the information to those DVRs 102 having a recording schedule comprising at least one program identification associated with a channel that was not selected.

By receiving the information, the DVRs 102 are aware of whether their recording schedule can be fully executed. In this way, the DVRs whose recording schedules are conflicting with the channel allocation plan have the possibility to change their recording schedule accordingly. DVRs with a recording schedule that is at least partially determined by an automatic recommender system can use the recommender system to select alternative programs that still fall within the user's preferences. Alternatively or additionally, the DVR 102 can alert a user and ask them to choose an alternative recording.

The transmitter 112 also encodes, multiplexes and transmits the selected subset of channels from the channels associated with the at least one program identification to at least one of the plurality of DVRs 102 via the input/output terminal 108 (step 310).

The receiver 208 of the DVR 102 receives, via the input terminal 206, the information indicating channels associated with the program identifications of the recording schedule that were not selected (step 312). The receiver 208 inputs the received information into the processor 210 and the processor adapts the recording schedule of the DVR on the basis of the received information (step 314). For example, the processor 210 outputs a request to a user requesting the user to select alternative program identifications to be included in the adapted recording schedule. A user may change the recording schedule at any time via the input/output terminal 212 (for example, using a remote control). The DVR 102 may also change the recording schedule (for example, upon receiving new electronic program guide data). The DVR 102 may change the recording schedule to a completely new recording schedule. If the recording schedule is changed by the DVR 102 and/or if the recording schedule is changed by a user, the processor 210 updates the recording schedule accordingly.

The receiver 208 of the DVR 102 also receives the selected subset of channels (step 316). The receiver 208 inputs the received selected subset of channels into the processor 210 and the processor 210 outputs the selected subset of channels to a rendering device via the input/output terminal 212 for recording or playback (step 318).

When the DVRs require a really simple syndication (RSS) podcast feed to be recorded, the system 100 redirects the DVRs 102 to a copy of the content, which has been pre-downloaded at a particular convenient time to a particularly convenient server. This prevents the DVRs 102 from downloading the same podcast from the original location each time it is required, which would consume a great deal of bandwidth in an unpredictable way.

The invention can be applied to switched digital video systems, internet protocol television (IPTV) systems, DVRs, set-top boxes, TV sets, etc.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method for transmitting channels to at least one digital video recorder, each of the at least one digital video recorder having a recording schedule, the method comprising:
   receiving at least one recording schedule from a plurality of digital video recorders before a deadline imposed to each of the plurality of digital video recorders for transmission of their recording schedules, each of said at least one recording schedule comprising at least one program identification;
   selecting a subset of channels from the channels associated with said at least one program identification of said received at least one recording schedule;
   transmitting information to at least one of said plurality of digital video recorders, said information indicating channels associated with said at least one program identification of said at least one recording schedule that were not selected; and
   transmitting said selected subset of channels to at least one of said plurality of digital video recorders.

2. The method according to claim 1, wherein said at least one program identification identifies a plurality of programs, each of said plurality of programs having a priority value and wherein selecting a subset of channels from the channels associated with said at least one program identification comprises selecting a subset of channels from the channels associated with said at least one program identification on the basis of said priority values.

3. The method according to claim 1, wherein transmitting information to at least one of said plurality of digital video recorders comprises transmitting said information to digital video recorders having a recording schedule comprising at least one program identification associated with a channel that was not selected.

4. The method according to claim 1, wherein selecting a subset of channels from the channels associated with said at least one program identification comprises selecting a subset of channels from the channels associated with said at least one program identification based on statistics of most popular channels divided by time of the day, day, region.

5. A digital video recorder, comprising:
   a scheduler for generating a recording schedule, said recording schedule comprising at least one program identification;
   a transmitter for transmitting said generated recording schedule to a server before a deadline imposed to the digital video recorder for transmission of its recording schedule; and
   a receiver for receiving a selected subset of channels from the channels associated with said at least one program identification and for receiving information indicating channels associated with said at least one program identification of said recording schedule that were not selected.

6. The digital video recorder according to claim 5, further comprising:
   a processor for adapting said recording schedule on the basis of said received information.

7. The digital video recorder according to claim 6, wherein said recording schedule is determined according to user preferences and wherein said recording schedule is adapted automatically on the basis of said user preferences.

8. The digital video recorder according to claim 6, wherein said recording schedule is adapted by requesting a user to select alternative program identifications to be included in said adapted recording schedule.

9. The digital video recorder according to claim 6, wherein each of said at least one program identification identifies a plurality of programs and wherein said plurality of programs are selected by a user and/or automatically selected by said digital video recorder.

10. The digital video recorder according to claim 9, wherein programs selected by a user have a higher priority value than programs automatically selected by said digital video recorder.

11. The digital video recorder according to claim 6, wherein said processor further updates said recording schedule if said recording schedule is changed by said digital video recorder or if said recording schedule is changed by a user.

12. A server comprising:
   a receiver for receiving at least one recording schedule from a plurality of digital video recorders before a deadline imposed to each of the plurality of digital video recorders for transmission of their recording schedules, said at least one recording schedule comprising at least one program identification;
   a selector for selecting a subset of channels from the channels associated with said at least one program identification of said received at least one recording schedule;
   a transmitter for transmitting information to at least one of said plurality of digital video recorders, said information indicating channels associated with said at least one program identification of said at least one recording schedule that were not selected and transmitting said selected subset of channels to at least one of said plurality of digital video recorders.

13. A system for transmitting channels to at least one digital video recorder, the system comprising:
   a plurality of digital video recorders, each of said plurality of digital video recorders having a recording schedule;
   a receiver for receiving at least one recording schedule from said plurality of digital video recorders before a deadline imposed to each of the plurality of digital video recorders for transmission of their recording schedules, each of said at least one recording schedule comprising at least one program identification;
   a selector for selecting a subset of channels from the channels associated with said at least one program identification of said received at least one recording schedule;
   a transmitter for transmitting information to at least one of said plurality of digital video recorders, said information indicating channels associated with said at least one program identification of said recording schedule that were not selected and transmitting said selected subset of channels to at least one of said plurality of digital video recorders.

* * * * *